United States Patent

Do et al.

[11] Patent Number: 5,828,819
[45] Date of Patent: Oct. 27, 1998

[54] APPARATUS AND METHOD FOR AUTOMATICALLY CREATING A PICTURE IN A STYLE HAVING PAINTING-LIKE COLORING USING AN IMAGE PROCESSING

[75] Inventors: Hyun Sook Do; Pyung Dong Cho, both of Yuseong-Ku, Rep. of Korea

[73] Assignees: Electronics and Telecommunications Research Institute; Korea Telecommunication Authority, both of Rep. of Korea

[21] Appl. No.: 578,093

[22] Filed: Dec. 26, 1995

[30] Foreign Application Priority Data

Dec. 23, 1994 [KR] Rep. of Korea ............... 1994-36988

[51] Int. Cl.[6] ........................................... G09G 5/04
[52] U.S. Cl. ............................................... 395/131
[58] Field of Search .................... 395/119, 118, 395/129, 130, 131, 133

[56] References Cited

U.S. PATENT DOCUMENTS

| 5,600,764 | 2/1997 | Kakutani | 395/131 |
| 5,614,925 | 3/1997 | Braudaway et al. | 395/131 X |
| 5,625,762 | 4/1997 | Takizawa et al. | 395/131 |
| 5,630,038 | 5/1997 | Itoh et al. | 395/131 |
| 5,649,083 | 7/1997 | Barkans et al. | 395/131 |

*Primary Examiner*—Phu K. Nguyen
*Assistant Examiner*—Cliff N. Vo
*Attorney, Agent, or Firm*—Blakely Sokoloff Taylor & Zafman

[57] ABSTRACT

The present invention has the effect that the users can automatically create a natural picture in the style of painting-like color, as if it is a photograph, by directly manufacturing a terminal of a new communication service with the spread of multi media applications and next-generation intelligence network services, and that a lot of memory is not desired in the computer graphics system having three-dimensional model to express an embossed effect by applying the style having painting-like coloring to two-dimensional model.

18 Claims, 6 Drawing Sheets

APPARATUS AND METHOD FOR AUTOMATICALLY CREATING A PICTURE IN A STYLE HAVING PAINTING-LIKE COLORING USING AN IMAGE PROCESSING

FIELD OF THE INVENTION

The present invention relates to an apparatus and method for creating a picture, and more particularly, relates to an apparatus and method for creating a picture in the style having painting-like coloring using a image processing.

BACKGROUND OF THE INVENTION

Generally, the computer graphics research scope has put its greatest concern on the realistic expression of an object.

However, in the scope to express objects of nature and human movement, it has been difficult to create a realistic looking picture. In other scopes, it has been possible to obtain a realistic looking picture, as if it is a photograph, using a technique of computer graphics such as shading, ray tracing and fractal.

Paint systems currently used by designers and artists are menu-driven programs for handpainting two-dimensional images. That is to say, they are manners that select the color, the shape and the size of brush, etc., by moving a pen and a mouse attached to the computer.

These paint systems from time to time undergo a supplement and modification according to the desire of the users, together with the development experiences of the developers who have developed these paint systems. On the other hand, research and development related to the automatic paint system, which is different from the above-mentioned interactive paint system, has now been actively accomplished.

In conventional techniques for creating a painting-like image, there are the "Adobe Photoshop" and the "Abstract image representation" by Paul Haeberli.

Although the "Adobe Photoshop" has the function to create a pointillist representation-like image, it simply uses a filter and the result doesn't give a satisfactory effect to the users. Also, "Abstract image representation" by Paul Haeberli gives the intense impression that the pointillist representation-like image is artificially formed.

SUMMARY OF THE INVENTION

An object of the present invention is to provide an apparatus and method for automatically creating a picture of high quality in a pointillist representation-like image, as if a person is painting a natural picture, by analyzing an input picture and determining a brush, and by converting the color using the RGB (Red, Green, Blue) element in the picture.

Another object of the present invention is to provide an apparatus and method for automatically creating a picture of high quality in the style of oil painting and water-color painting by determining the direction and size of the brush.

In accordance with an aspect of the present invention, there is provided an apparatus comprising: a picture input means for receiving two-dimensional picture; a ground creating means for creating a ground which is relative to complementary color for each pixel of the natural picture input from the picture input means; a brush position determining means for calculating the gradient vectors using the Gaussian function and brilliance of the natural picture input from the picture input means, and dividing the input picture into small regions, determining the position of the brush using the calculated gradient vectors; a color converting means for converting the value of brilliance and chroma of the input picture using the RGB value of the natural picture input from the picture input means; and a paint layer creating means for painting a picture on a computer graphics system using the results from the ground creating means, the brush position determining means and the color converting means, and for repeatedly painting new pictures on the computer graphics system using previously painted picture as a new ground according to the small regions divided by the brush position determining means.

In accordance with another aspect of the present invention, there is provided a method comprising the steps of: receiving a two-dimensional natural picture; creating a ground which is relative to complementary color for each pixel of the natural picture; calculating the gradient vectors using the Gaussian function and brilliance of the natural picture; dividing the input picture into small regions, determining the position of the brush using the calculated gradient vectors; converting the value of brilliance and chroma of the input picture using a color model; and painting a picture on a computer graphics system using the created ground, the determined brush position, the converted brilliance and chroma, and the shape of the brush which is input from the outside, and repeatedly painting new pictures on the computer graphics system using previously painted picture as a new ground according to the divided small regions.

In accordance with a further aspect of the present invention, there is provided an apparatus comprising: a picture input means for receiving a two-dimensional natural picture; a color converting means for converting the value of brilliance and chroma using the RGB value of the natural picture input from the picture input means; a brush direction/size determining means for dividing the input picture into small regions, and for calculating the gradient vectors for the divided small regions using the Gaussian function and brilliance of the natural picture input from the picture input means, and determining the size of the brush using the calculated gradient vectors of the pixels in each of the divided small regions, and determining the direction of the brush by calculating the angles of the gradient vectors for the x-axis in each of the divided small regions; and a picture creating means for painting a new picture on the computer graphics system using the results from the color converting means and the brush direction/size determining means.

In accordance with still another aspect of the present invention, there is provided a method comprising the steps of: receiving input picture from an image scanner; calculating gradient vectors using brilliance, and dividing the input picture into first regions, and sorting the divided small regions; setting up second regions to be processed; determining the position and size of the brush; painting a new picture on the computer graphics system using a color model which converts brilliance and chroma of the input picture.

In accordance with yet a further aspect of the present invention, there is provided a method comprising the steps of: receiving a two-dimensional natural picture; converting the value of brilliance and chroma using the RGB value of the natural picture input; dividing the input picture into small regions, and for calculating the gradient vectors for the divided small regions using the Gaussian function and brilliance of the natural picture input, and determining the size of the brush using the calculated gradient vectors of the pixels in each of the divided small regions, and determining the direction of the brush by calculating the angles of the gradient vectors for the x-axis in each of the divided small regions; and painting a new picture on the computer graphics system using the determined direction and size of the brush, the converted brilliance and chroma.

BRIEF DESCRIPTION OF THE DRAWINGS

The above and other aspects and advantages of the present invention are described in conjunction with the following drawing figures, in which.

DETAILED DESCRIPTION OF THE INVENTION

Hereinafter, one embodiment of the present invention will be described below.

In the present invention, two points are considered to create a picture.

First, when a person makes a drawing, he touches with a brush a picture with contours of an object in the center. This can be expressed in a computer which analyzes the input picture. That is to say, the computer calculates gradient vectors in the picture and expresses another picture using the size of the gradient vectors.

Second, another point to be considered is the expression of color. Color can be expressed as bright or dark according to the object, particularly the face of a person. This can be accomplished by using the RGB element in the picture.

Figure 1:
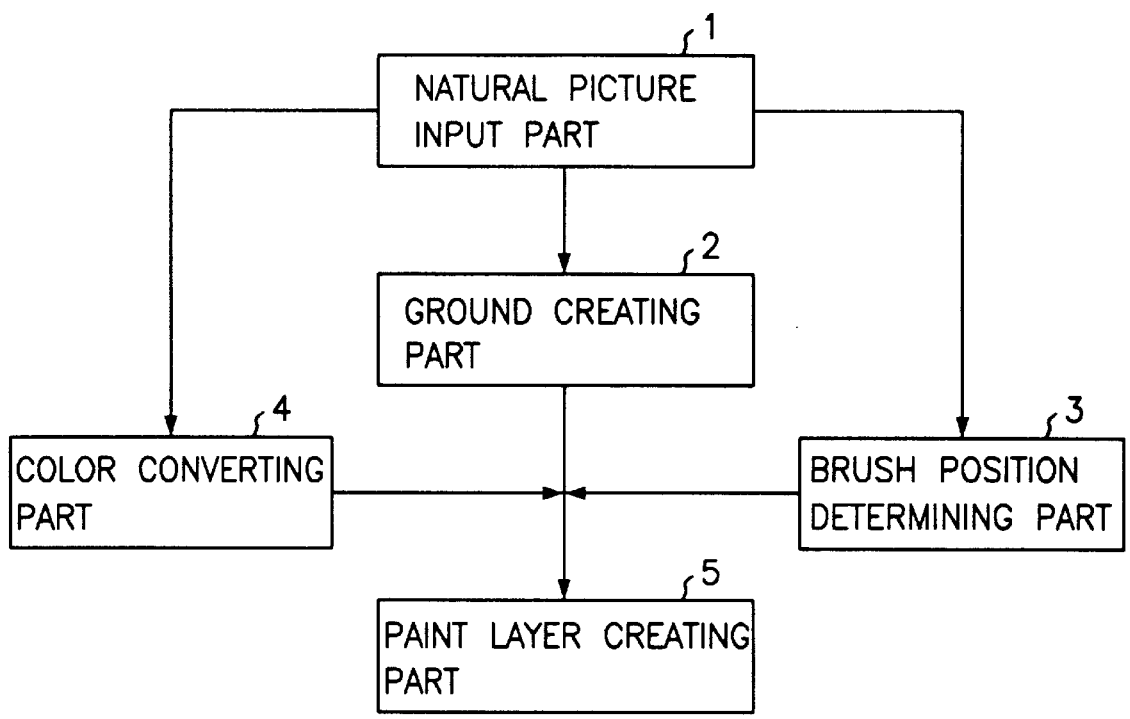
FIG. 1 is a block diagram illustrating a generator that forms a pointillist representation-like image in accordance with an embodiment of the present invention.

FIG. 1 is a block diagram illustrating a generator that forms a picture in a pointillist representation-like image in accordance with the present invention. As shown in FIG. 1, a natural picture input part 1 is similar to an image scanner receiving two-dimensional picture. A ground creating part 2 obtains another picture (ground) which is relative to complementary color for each pixel of the natural picture input from the natural picture input part 1. A brush position determining part 3 obtains the gradient vectors using the Gaussian function and brilliance of the natural picture input from the natural picture input part 1, and divides the natural picture, which is input from the natural picture input part 1, into small regions, and then determines the position of the brush using the calculated gradient vectors. To leave a vivid impression upon a person's mind, a color converting part 4 converts the value of brilliance and chroma using the RGB value of the natural picture input from the natural picture input part 1. A paint layer creating part 5 paints the picture with the brush in combination with color conversation processes though the ground creating part 2, the brush position determining part 3 and the color converting part 4, and repeats the painting according to the natural picture divided into small regions.

The function of the blocks in FIG. 1 will be described in detail below.

First, the picture used in the present invention is a two-dimensional picture. In the natural picture input part 1, a two-dimensional natural picture, such as a photograph, is input into the computer with an image scanner. At this time, the RGB of the input picture is 256 steps, its size is 640×512. The basic information, which the picture has, is the shape, the gray level and the color.

In the brush position determining part 3, the tint of the picture, i.e., brilliance, is used for analyzing the position of the touched brush. When a person makes a drawing, he commonly moves the brush according to the contours of the object. To process the drawing automatically, gradient vectors of brilliance in the picture are obtained, and then the position of the brush is determined using the fact that there are elements parallel to the contours in the direction of the gradient vectors.

The gradient vectors are obtained by the procedure as follows.

First, brilliance L(x,y) of the input picture is obtained using the equation <1> below:

$$L(x,y)=0.3r(x,y)+0.59g(x,y)+0.11b(x,y) \qquad <1>$$

where, R(x,y) is a red component

G(x,y) is a green component

B(x,y) is a blue component

Next, the convolution between the brilliance L(x,y) and the Gaussian function H(x,y) is obtained, and then, the result is primarily differentiated. The primary differential result in the direction of X and Y is Gx(x,y) and Gy(x,y), respectively, as shown in equation <2> and <3> below:

$$Gx(x,y)=\{H(x,y)\times L(x,y)\}/x \qquad <2>$$

$$Gy(x,y)=\{H(x,y)\times L(x,y)\}/y \qquad <3>$$

Also, the size of the differential, //G(x,y)//, is obtained as shown equation <4> below:

$$//G(x,y)//=\{Gx(x,y)+Gy(x,y)\} \qquad <4>$$

The method for determining the position of the brush will be described in detail referring to FIG. 3.

The shape of the brush, which is used for creating the pointillist representation-like image, is defined by the user. A round-shaped brush, such as a circle, is used in the present invention in order to express the art of drawing as if to mark with a point. Also, the values of chroma and brilliance in the edge of the brush is increased to emphasize its edge.

Color models, such as RGB, CMY (Cyan, Magenta, Yellow), YIQ, HSV (Hue, Saturation (Chroma), Value), etc., which are well-known to those having ordinary skill in the art to which the subject matter pertains, is used for controlling the color of the input picture. Particularly, since the HSV color model, which is widely used in an application package, lets the user control the color intuitively. The color converting part 4 of the present invention also uses the HSV color model.

Accordingly, the color values of the input picture expressed as the RGB color model must be converted into the color values of the picture expressed as the HVS color model. The HSV color model is hexagonal conic and the color undergoes a change according to the outskirts of a hexagon. Chroma changes according to the direction of a horizontal axis and brilliance changes according to the perpendicular axis. After converting the color, the converted HSV color model is converted into the RGB color model which is the basic information of the picture expression.

The picture may be bright or dark according to the drawing object, the emotion and the style of the artists. In a computer, this effects can be accomplished by changing chroma and brilliance using the HSV color model. To express the picture as vivid and bright, the present invention increases the S value indicative of chroma and the V value indicative of brilliance.

Chroma has a range of 0.0 through 1.0, and chroma 0.0 and 1.0 indicates an achromatic color and a chromatic color, respectively. Brilliance has a range of 0 through 255, and brilliance 0 and 255 indicates black and white, respectively. In the proffered embodiment of the present invention, chroma has a range of 1.25×S through 1.7×S, and brilliance has a range of 1.2×V through 1.5 xV.

The paint layer 5 in accordance with the present invention is constructed of multi-layers.

Generally, an artist makes a drawing after painting one or two ground colors on the entire canvas. When they make a drawing on the canvas which has a background, they repeat painting on the canvas to prevent the colors from mixing together. This is called the style of paint layers. The present invention creates a picture in the pointillist representation-like images using a image processing on the basis of the style of paint layers. That is to say, to increase the vividness of the completed picture, the color to be the ground is created by a complementary color of the input picture.

Since a picture in the pointillist representation-like image according to one embodiment of the present invention makes a drawing with innumerable dots which are the same shape as the brush, it creates a delicate picture and doesn't gives the sense of the direction of the brush. Therefore, the present invention creates the picture considering only the position of the touched brush and the color changes.

The method for creating a picture in the pointillist representation-like image in accordance with one embodiment of the present invention will be described referring to FIG. 2.

As stated above, at step 11, a two-dimensional natural picture is receive by an image scanner. At step 12, the picture having a complementary color relation is obtained as the ground of the picture to be completed at step 12. To determine the position of the brush, gradient vectors are obtained as stated above at step 13. At step 14, the input picture is divided into n1 small regions and the position of the brush is determined by looking for the position of the pixel having the maximum value of //G(x,y)// in each of the small regions, which will be described in detail in FIG. 3. At step 17, the paint layer 1 creates the first picture by painting on the ground according to the position and size of the brush which is determined by the n1 small regions at step 14. After creating the paint layer 1, the n1 small regions are broken into more n2 small regions and a new fine position of the brush is determined. At step 18, the paint layer 2 creates the second picture by using the new fine position of the brush and the picture created by the paint layer 1 as a new ground. Likewise, the n2 small regions are broken into more n3 small regions and the paint layer 3 creates, at step 19, the final picture by using the new fine position of the brush and the picture created by the paint layer 2 as a new ground.

Figure 2:
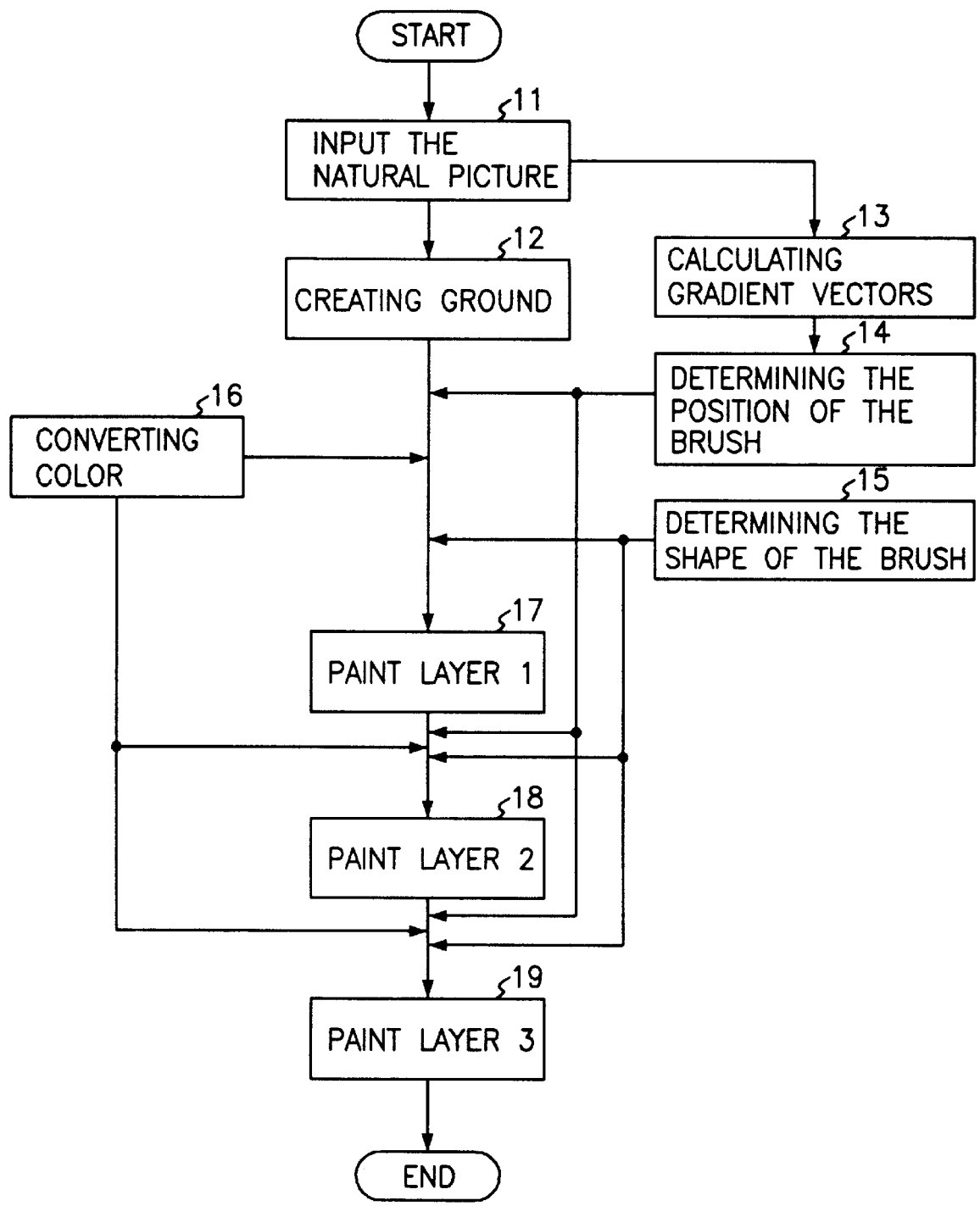
FIG. 2 is a flow chart illustrating the generation of a picture in a pointillist representation-like image in accordance with an embodiment of the present invention.
Figure 3:
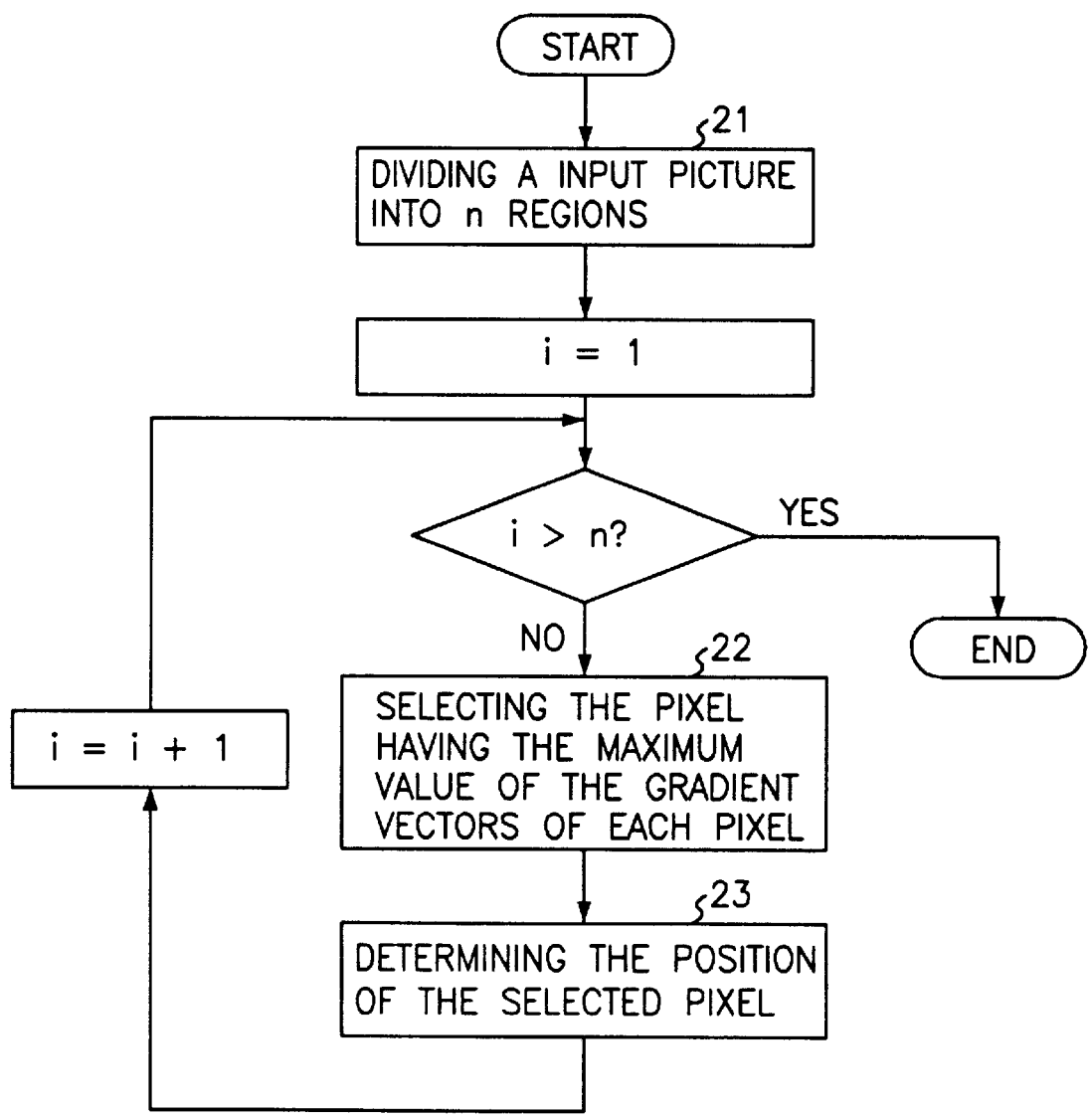
FIG. 3 is a flow chart illustrating the method for determining the position of the brush in FIG. 2.

FIG. 3 is a flow chart illustrating the method for determining the position of the brush in FIG. 2.

As stated above, at step 21, the input picture is divided into n small regions. At step 22, the position of the pixel, which has the maximum value of gradient vectors //G(x,y)// in the i-th region of the n divided small regions, is selected. At step 23, the position of the selected pixel is determined as the brush. With respect to all the n divided small regions, step 22 and 23 are repeated until i=n, and then the position of the brush is selected for each of the n divided small regions.

Figure 4:
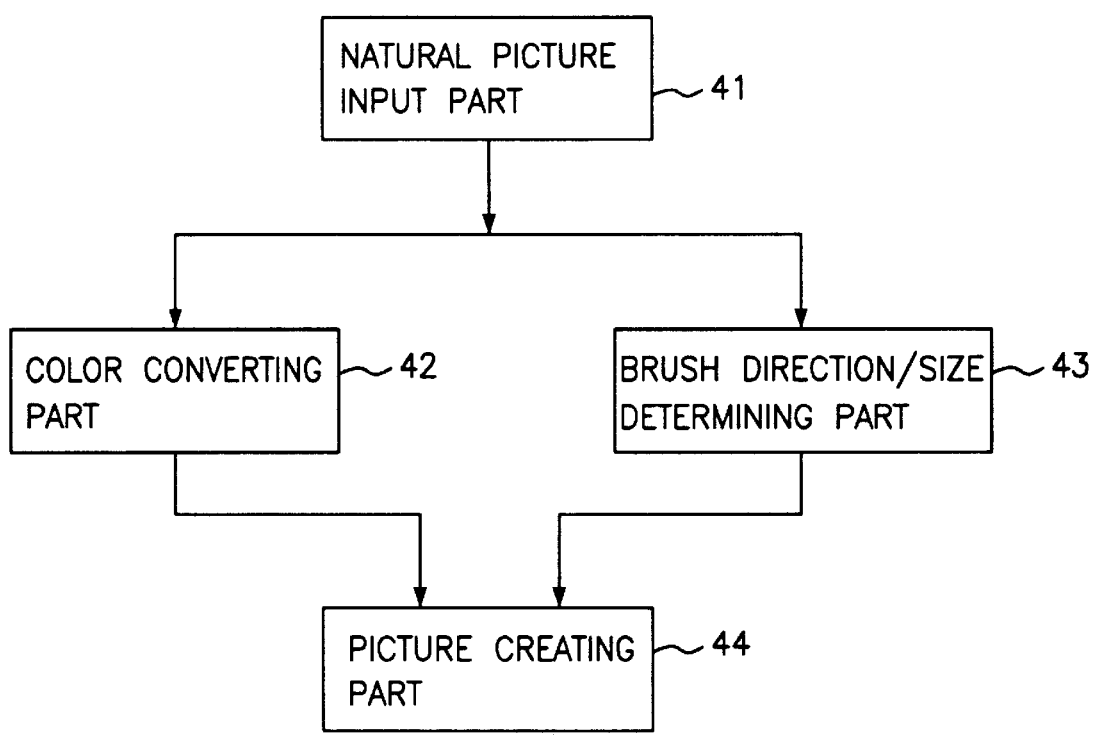
FIG. 4 is a block diagram illustrating a generator that forms a picture in the style of oil painting and water-color painting in accordance with another embodiment of the present invention.
Figure 5:
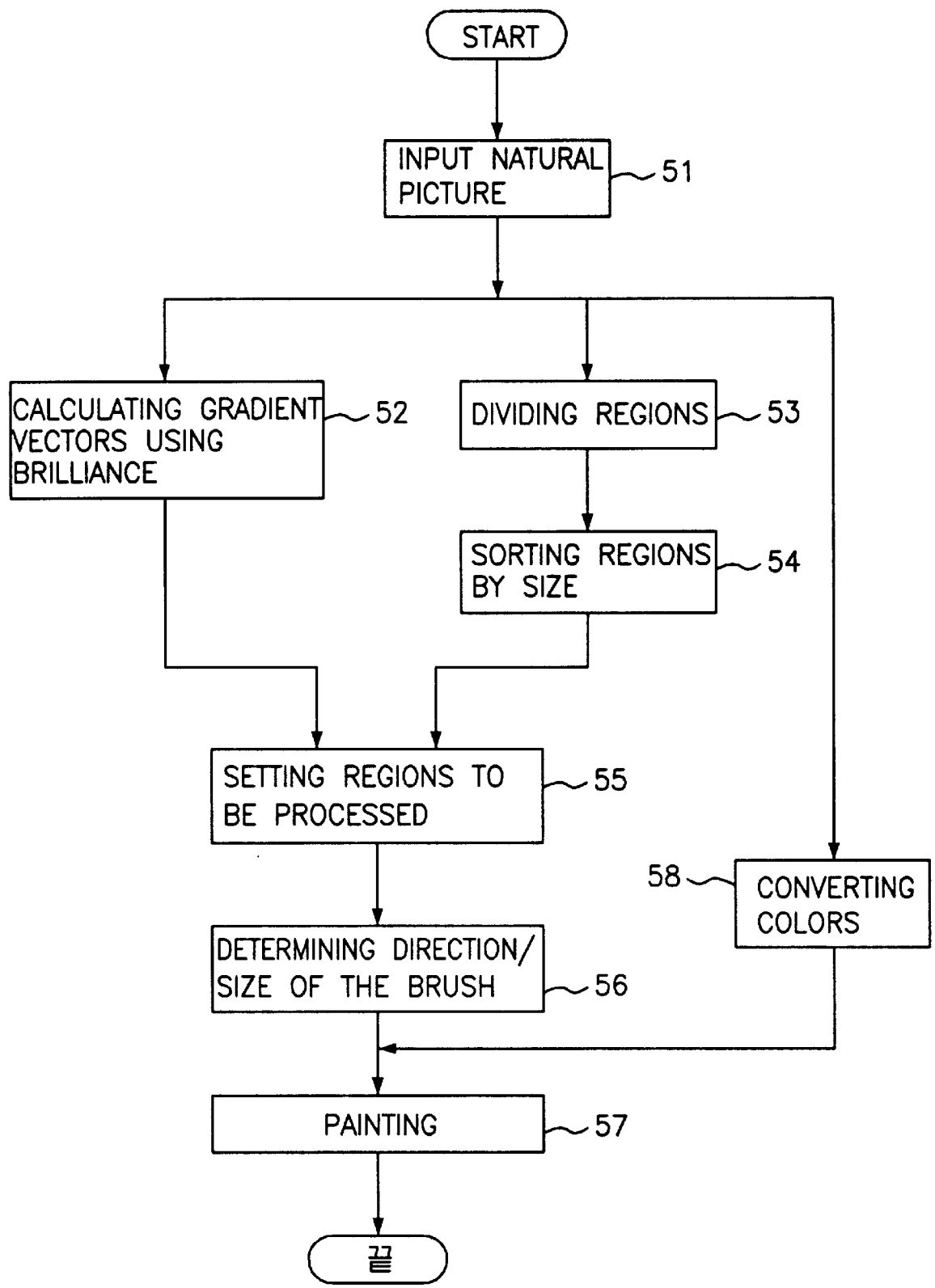
FIG. 5 is a flow chart illustrating the generation of a picture in the style of oil painting and water-color painting in accordance with another embodiment of the present invention.
Figure 6:
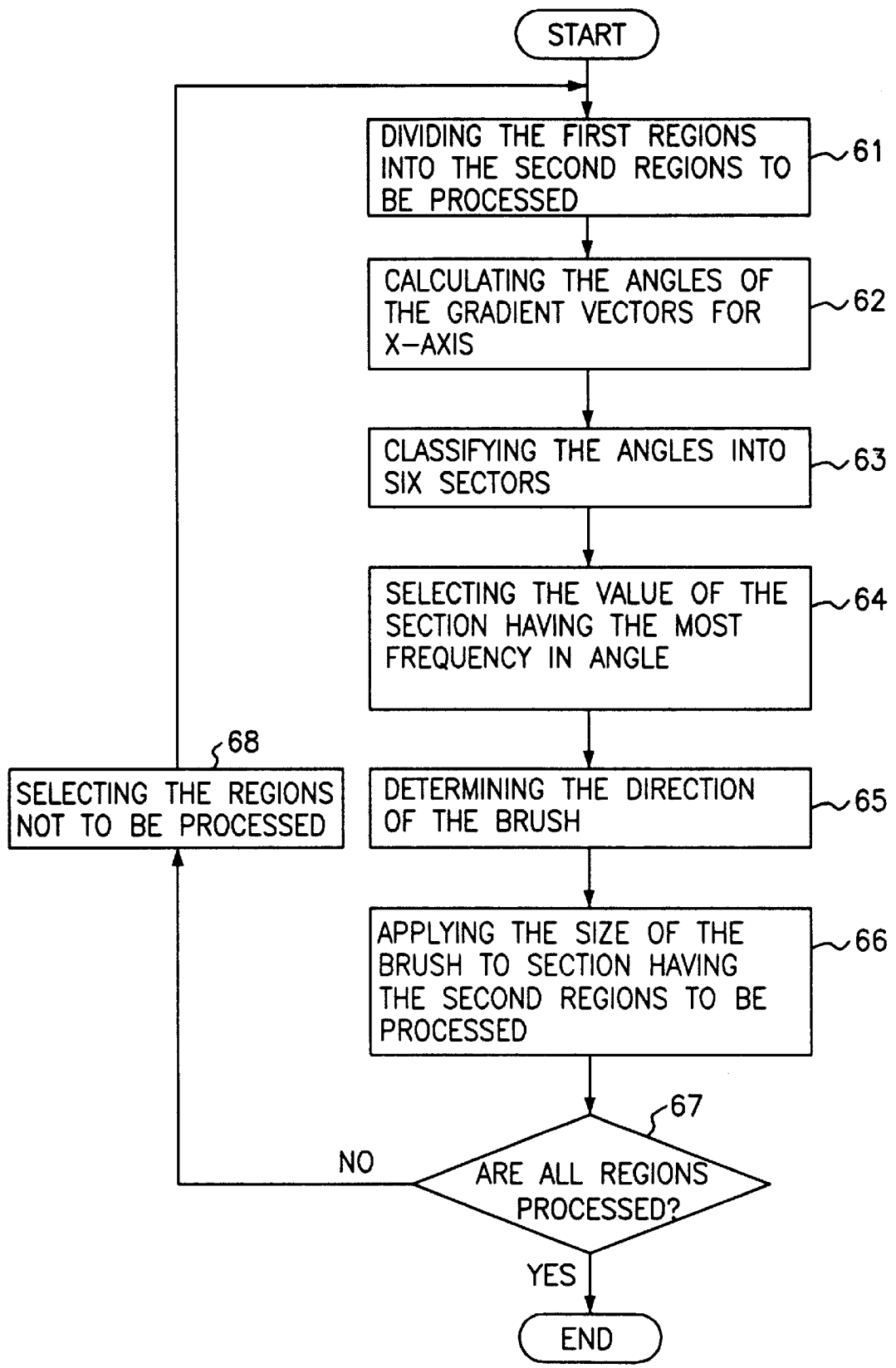
FIG. 6 is a flow chart illustrating the method for determining the direction/size of the brush in FIG. 5.

Referring to FIGS. 4 through 6, an apparatus and method for creating a picture the style of oil painting and water-color painting, in accordance with another embodiment of the present invention, will be described in detail below.

In FIG. 4, a natural picture input part 41 receive a nature picture from an image scanner. To obtain a vivid picture, a color converting part 42 converts the value of brilliance and chroma using the RGB value of the natural picture input from the natural picture input part 41. A brush direction/size determining part 43 calculates the gradient vectors using brilliance of the natural picture input from the natural picture input part 41, and then determines the size of the brush by calculating the gradient vectors which are obtained from brilliance and Gaussian Functions, and the direction of the angles of the gradient vectors for the x-axis. A picture creating part 44 paints a new picture on the computer in combination with the position and size of the brush and color change from the color converting part 42.

FIG. 5 is a flow chart illustrating the generation of a picture in the style of oil painting and water-color painting in accordance with another embodiment of the present invention.

As shown in FIG. 5, at step 51, a natural picture is input from an image scanner. At step 52, gradient vectors are obtained using brilliance L(x,y) and the Gaussian function H(x,y) according to the above equation <1> and <2>.

Next, to decrease the time for painting a picture and for determining the size of the brush, the input picture is divided into small regions according to characteristics of the input picture using the region growing method at step 53. At this time, color, chroma and brilliance are used as characteristic values and there is a difference between the results of the region division according as what these values are set up. Since dividing the input picture into small regions may cause many problems at the time of painting the picture, sorting the regions and applying the size of the brush to the picture on the computer, the region division is selected in the range of color 40 (0–360), chroma 0.3 (0.0–1.0), brilliance 10 (1–255) in the preferred embodiment.

At step 54, the first small regions are sorted in the order of their size. At step 55, the second small regions, which are to be smaller fundamental units than the regions divided at step 53, are set up. At this time, the sorted regions are classified into three regions by the size of the region to be processed, and the classified regions are regarded as the references of second small regions to be processed and the size of the brush.

At step 56, the size of the brush is determined and the direction of the brush is determined by the angles, A(x,y), of the gradient vectors for the x-axis:

$$A(x,y) = \arctan\{Gy(x,y)/Gx(x,y)\} \qquad <5>$$

At step 57, color conversation is performed in the same manner as the one embodiment stated above, and, at step 58, painting is performed according to the determined direction/size of the brush and the result of the color conversation. Particularly, at step 57, to emphasize an oil painting having a clear and bright feeling, the values of brilliance and chroma must be increased, on the other hand, to emphasize a water-color painting having a transparent feeling, and the values of brilliance must be increased while the values of chroma must be decreased.

FIG. 6 is a flow chart illustrating the method for determining the direction/size of the brush in FIG. 5 in detail.

At step 61, the first small regions, which are divided at step 53 in FIG. 5, are divided into the second small regions having the size to be processed.

At step 62, the angles of the gradient vectors for x-axis are obtained with respect brilliance of each pixel in the second small regions.

At step 63, the angles resulted from step 62 are classified into six sections. At this time, the angles have a range of −90 degrees through 90 degrees, and these angles are classified into six sections. That is, the first section is not less than 70 degrees or is not more than −70 degrees, the second section is not less than 40 degrees and is not more than 70 degrees, the third section is not less than 10 degrees and is not more than 40 degrees, the fourth section is not less than −10 degrees and is not more than 10 degrees, the fifth section is not less than −40 degrees and is not more than −10 degrees, and the sixth section is not less than −70 degrees and is not more than −40 degrees.

At step 64, the value of the section, having the most frequency in angle, is selected, by calculating distribution of angles, which are divided into six sections, with respect to the second small regions to be processed. At this time, the shape of the brush is defined according to the section which is derived from step 63.

At step 65, the direction of the brush is determined according to the value of the section having the most frequency in angle.

The determination of the size of the brush, after determining the direction of the brush, is based on a portion of the procedure shown in FIG. 5. That is to say, classifying the sorted regions into three regions, at step 55 in FIG. 5, is used not only for setting up the second small regions to be processed but also for determining the size of the brush. Then, at step 66, the size of the brush is applied to the section having the second small regions to be processed, referring to the size of the brush defined as three sorts. This has an effect on economy of time, simplification of an algorithm and expression of the painting.

At step 67, after examining all the second small regions upon the determination of the direction and size of the brush. If the direction and size of the brush are not determined in all the second small regions, other regions of which the direction and size of the brush are not determined are selected at step 68, and step 61 through 66 are repeated.

As mentioned above, the present invention has the effect that the users can automatically create a natural picture in the style of painting-like color, as if it is a photograph, by directly manufacturing a terminal of a new communication service with the spread of multi media applications and next-generation intelligence network services, and that a lot of memory is not desired in the computer graphics system having three-dimensional model to express an embossed effect by applying the style having painting-like coloring to two-dimensional model.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for automatically creating a picture in a style having painting-like coloring, comprising:

a picture input means for receiving two-dimensional picture;

a ground creating means for creating a ground which is relative to complementary color for each pixel of the natural picture input from the picture input means;

a brush position determining means for calculating the gradient vectors using the Gaussian function and brilliance of the natural picture input from the picture input means, and dividing the input picture into small regions, determining the position of the brush using the calculated gradient vectors;

a color converting means for converting the value of brilliance and chroma of the input picture using the RGB value of the natural picture input from the picture input means; and a paint layer creating means for painting a picture on a computer graphics system using the results from the ground creating means, the brush position determining means and the color converting means, and for repeatedly painting new pictures on the computer graphics system using previously painted picture as a new ground according to the small regions divided by the brush position determining means.

2. A method for automatically creating a picture in a style having painting-like coloring, comprising the steps of:

receiving a two-dimensional natural picture;

creating a ground which is relative to complementary color for each pixel of the natural picture;

calculating the gradient vectors using the Gaussian function and brilliance of the natural picture;

dividing the input picture into small regions, determining the position of the brush using the calculated gradient vectors;

converting the value of brilliance and chroma of the input picture using a color model; and painting a picture on a computer graphics system using the created ground, the determined brush position, the converted brilliance and chroma, and the shape of the brush which is input from the outside, and repeatedly painting new pictures on the computer graphics system using previously painted picture as a new ground according to the divided small regions.

3. A method in accordance with claim 2, wherein the step of dividing the input picture and determining the position of the brush comprises the steps of:

a) dividing the input picture into small regions;

b) selecting a pixel having the maximum value of the gradient vectors in one of the divided small regions c) determining the position of the selected pixel as the position of the brush; and d) executing the step b) and c) with respect to all of the divided small regions.

4. A method in accordance with claim 2, wherein the color model is the HSV color model.

5. A method in accordance with claim 4, wherein the HSV color model increases the values of brilliance and chroma to emphasize a picture in a pointillist representation-like image.

6. A method in accordance with claim 4, wherein the HSV color model increases the values of brilliance and chroma in the edges between the brushes to increase an embossed effect.

7. A method in accordance with claim 4, wherein the value of brilliance has a range of 1.25×S (S: Chroma of the HSV color model) through 1.7×S.

8. A method in accordance with claim 4, wherein the value of brilliance has a range of 1.2×V (V: brilliance of the HSV color model) through 1.5×V.

9. An apparatus for automatically creating a picture in a style having painting-like coloring, comprising:

a picture input means for receiving a two-dimensional natural picture;

a color converting means for converting the value of brilliance and chroma using the RGB value of the natural picture input from the picture input means;

a brush direction/size determining means for dividing the input picture into small regions, and for calculating the gradient vectors for the divided small regions using the Gaussian function and brilliance of the natural picture input from the picture input means, and determining the size of the brush using the calculated gradient vectors of the pixels in each of the divided small regions, and determining the direction of the brush by calculating the angles of the gradient vectors for the x-axis in each of the divided small regions; and a picture creating means for painting a new picture on the computer graphics system using the results from the color converting means and the brush direction/size determining means.

10. A method for automatically creating a picture in a style having painting-like coloring, comprising the steps of:

a) receiving input picture from an image scanner;

b) calculating gradient vectors using brilliance, and dividing the input picture into first regions, and sorting the divided small regions;

c) setting up second regions to be processed;

d) determining the position and size of the brush;

e) painting a new picture on the computer graphics system using a color model which converts brilliance and chroma of the input picture.

11. A method in accordance with claim 10, wherein the step of d) comprises the steps of:

1) dividing the first regions into second regions having the size to be processed;

2) calculating the angles of the gradient vectors of each pixel in the second regions for x-axis;

3) classifying the angles into a plurality of sections;

4) calculating the distribution of the angles and selecting the value of the section having the most frequency in angle;

5) determining the direction of the brush according to the value of the section having the most frequency in angle;

6) determining the size of the brush base on the sorted regions at step of b); and 7) determining the direction and size of the brush regarding all of the second regions by repeatedly performing the steps of 1) to 6).

12. A method in accordance with claim 10, wherein the division of the first regions is performed by the region growing method which selects the region division in the range of color 40 (0–360), chroma 0.3 (0.0–1.0), brilliance 10 (1–255).

13. A method in accordance with claim 11, wherein the angles are classified into six sections comprising:

the first section which is not less than 70 degrees or is not more than −70 degrees;

the second section which is not less than 40 degrees and is not more than 70 degrees;

the third section which is not less than 10 degrees and is not more than 40 degrees;

the fourth section which is not less than −10 degrees and is not more than 10 degrees;

the fifth section which is not less than −40 degrees and is not more than −10 degrees; and the sixth section which is not less than −70 degrees and is not more than −40 degrees.

14. A method in accordance with claim 10, wherein the color model is the HSV color model.

15. A method in accordance with claim 14, wherein the HSV color model increases the values of brilliance and chroma to emphasize the style of oil painting.

16. A method in accordance with claim 14, wherein the HSV color model increases the values of brilliance and decreases the values of chroma to emphasize the style of water-color painting.

17. A method in accordance with claim 14, wherein the HSV color model increase the values of brilliance and chroma in the edges between the brushes to increase an embossed effect.

18. A method for automatically creating a picture in a style having painting-like coloring, comprising the steps of:

a) receiving a two-dimensional natural picture;

b) converting the value of brilliance and chroma using the RGB value of the natural picture input;

c) dividing the input picture into small regions, and for calculating the gradient vectors for the divided small regions using the Gaussian function and brilliance of the natural picture input, and determining the size of the brush using the calculated gradient vectors of the pixels in each of the divided small regions, and determining the direction of the brush by calculating the angles of the gradient vectors for the x-axis in each of the divided small regions; and d) painting a new picture on the computer graphics system using the determined direction and size of the brush, the converted brilliance and chroma.

* * * * *